United States Patent
Cadours et al.

(10) Patent No.: US 7,909,914 B2
(45) Date of Patent: Mar. 22, 2011

(54) METHOD OF REMOVING ACID GASES CONTAINED IN GASEOUS EFFLUENTS

(75) Inventors: Renaud Cadours, Francheville (FR); Julia Magne-Drisch, Villette-deVienne (FR); Bruno Delfort, Paris (FR)

(73) Assignee: IFP, Cedex (FR)

( * ) Notice: Subject to any disclaimer, the term of this patent is extended or adjusted under 35 U.S.C. 154(b) by 433 days.

(21) Appl. No.: 12/171,379

(22) Filed: Jul. 11, 2008

(65) Prior Publication Data

US 2009/0013872 A1    Jan. 15, 2009

(30) Foreign Application Priority Data

Jul. 12, 2007 (FR) .................... 07 05113

(51) Int. Cl.
 *B01D 53/14* (2006.01)
(52) U.S. Cl. ............... 95/174; 95/181; 95/183; 95/235; 95/236; 423/228
(58) Field of Classification Search ............... 95/172, 95/173, 174, 177, 178, 179, 181, 183, 235, 95/236; 423/242.2, 243.05, 228, 229
 See application file for complete search history.

(56) References Cited

U.S. PATENT DOCUMENTS

| 4,784,796 | A | * | 11/1988 | Treybig et al. ............... 252/392 |
| 5,167,941 | A | * | 12/1992 | Bedell ....................... 423/242.2 |
| 5,246,619 | A |   | 9/1993  | Niswander |
| 7,419,646 | B2 | * | 9/2008 | Cadours et al. ............... 423/220 |

FOREIGN PATENT DOCUMENTS

| EP | 0 216 486 | 4/1987 |
| FR | 2 888 247 | 1/2007 |
| FR | 2 900 841 | 11/2007 |

OTHER PUBLICATIONS

French Search Report FR 0705113, Mar. 6, 2008.

* cited by examiner

*Primary Examiner* — Duane Smith
*Assistant Examiner* — Ives Wu
(74) *Attorney, Agent, or Firm* — Antonelli, Terry, Stout & Kraus, LLP.

(57) ABSTRACT

The present invention relates to a method of removing acid gases, notably carbonyl sulfide, contained in gaseous effluents, comprising:
 an acid gas absorption stage by contacting the gaseous effluent with an aqueous solution comprising 2-[2-amino-1-(aminomethyl)ethoxy]ethanol, and possibly another alkanolamine and an organic compound, and
 at least one aqueous solution regeneration stage.

The method can comprise a second aqueous solution regeneration stage. The regeneration stages are carried out by expansion and/or thermal regeneration.

10 Claims, 2 Drawing Sheets

METHOD OF REMOVING ACID GASES CONTAINED IN GASEOUS EFFLUENTS

FIELD OF THE INVENTION

The present invention relates to the removal of acid compounds from gaseous effluents and notably to the removal of carbonyl sulfide from natural gas.

In the case of natural gas, three main treating operations are considered: deacidizing, dehydration and gasoline extraction. The purpose of the first stage, deacidizing, is to remove acid compounds such as carbon dioxide ($CO_2$), hydrogen sulfide ($H_2S$), carbonyl sulfide (COS) and mercaptans, mainly methylmercaptan, ethylmercaptan and propylmercaptans. The specifications generally allowed for deacidized gas are 2% $CO_2$, 4 ppm $H_2S$ and 20 to 50 ppm volume of total sulfur. The dehydration stage then allows to control the water content of the deacidized gas in relation to transport specifications. Finally, the stage of gasoline extraction from natural gas allows to guarantee the hydrocarbon dew point of the natural gas, also according to transport specifications.

Deacidizing is thus often carried out first, for various reasons. For safety reasons, toxic acid gases such as $H_2S$ are preferably removed in the first stage of the process chain. Another advantage of carrying out deacidizing in the first place is to prevent pollution of the various unit operations by these acid compounds, notably the dehydration section and the section intended for condensation and separation of heavier hydrocarbons. Furthermore, the presence of acid compounds in the latter section may lead to the production of various hydrocarbon cuts, $C_1$-$C_2$, $C_3$, $C_4$, $C_5^+$, which all need to be treated to meet requirements. Depending on the temperature and pressure conditions, some of these cuts are liquid, therefore requiring specific technologies for the removal of residual acid compounds.

Acid compounds such as $CO_2$ and $H_2S$ are generally removed by washing the gas with a solvent allowing absorption of these compounds preferentially to hydrocarbons. This absorption is preferably promoted by a chemical reaction. The most commonly used method consists in using an aqueous alkanolamine solution.

On the other hand, the case of sulfur-containing impurities such as mercaptans is notably different. In fact, there is no or little reaction between the mercaptans and the alkanolamines conventionally used. Absorption is then limited to the physical solubilization of these compounds in the solvent. This physical solubilization can be favoured by a specific formulation of the solvent. The result thereof often is a hydrocarbon loss through co-absorption. Removal of these mercaptans can therefore be preferably performed downstream from the deacidizing stage, for example by means of an adsorption sieve.

In the case of COS, the reaction kinetics remains limiting in relation to the other transfer phenomena involved upon contact between the gas to be treated and the aqueous alkanolamine solution. The conventional implementation methods are therefore often unsuitable to guarantee the specifications required for the treated gas. In fact, the carbonyl sulfide that is not absorbed during the deacidizing stage is eventually divided between the various products resulting from the hydrocarbon separation stage described above, which requires treating each of these cuts. Complete removal of the COS is therefore preferably carried out during the deacidizing stage.

BACKGROUND OF THE INVENTION

Patent FR-2,062,138 provides a solution to the removal of COS from natural gas. The method consists in promoting the absorption of COS by an aqueous alkanolamine solution by means of an absorption zone maintained at a temperature ranging between 60° C. and 90° C., preferably between 70° C. and 80° C. The aqueous alkanolamine solution then allows to collect the $CO_2$ and the $H_2S$ from the hydrolysis reaction in another zone operating under temperature conditions favoring removal of these two compounds. It is however necessary, according to patent FR-2,062,138, to first remove the $CO_2$ and the $H_2S$ present in the gas to be treated so as to promote the hydrolysis phenomenon.

U.S. Pat. No. 6,852,144 also describes a method of removing COS from hydrocarbons. The method uses a water-methyldiethanolamine or water-triethanolamine solvent with a high proportion of a compound belonging to the following group: piperazine and/or methylpiperazine and/or morpholine, allowing to achieve selective absorption of COS in relation to carbon dioxide.

Patent FR-2,888,247 can also be mentioned, which relates to a method of removing the COS contained in a liquid hydrocarbon feed by contacting the liquid hydrocarbon feed with a conventional alkanolamine solution by means of a membrane contactor.

It is however well known that the primary or secondary alkanolamines used in the methods described above promote a strong reaction with COS, with a quite significant risk of degradation in the presence of COS. Authors Kohl and Nielsen [Gas Purification, 5$^{th}$ Edition, Gulf Publishing Company] provide a brief description of the main alkanolamines used for treating natural gas. They show in their book that the reactivity of alkanolamine towards acid gases is correlated with the level of substitution of the nitrogen atom: the more the nitrogen atom is substituted, the less the alkanolamine is reactive. Primary alkanolamines are thus more reactive than tertiary alkanolamines. This reactivity can be related to the stability of the reaction products formed. Thus, the products resulting from the reaction of an acid gas with a primary alkanolamine are more stable than those resulting from a reaction with a tertiary alkanolamine. The regeneration of primary alkanolamines is therefore generally more difficult. Furthermore, it has been observed that primary alkanolamines involve a high degradation risk in the presence of COS. Direct reaction of COS with monoethanolamine (MEA), a primary alkanolamine, thus leads to non-regeneratable stable products. Diethanolurea, 2-oxazolidone and (2-hydroxyethyl)imidazolidone are the main products of the degradation of MEA in the presence of COS. This degradation process is closely linked with the operating conditions of the solvent regeneration stage. MEA and most primary alkanaolamines are therefore not considered as regeneratable solvents for COS removal.

Diethanolamine (DEA), a secondary alkanolamine, is also widely used for the removal of acid products from a gas or liquid effluent. Its basicity allows total deacidizing and deep removal of COS. According to Dawodu (1991), DEA degrades in the presence of COS and gives water-soluble degradation products, as well as a sulfur-rich insoluble solid. Despite this drawback, DEA remains one of the most widely used alkanolamines for deacidizing a gaseous effluent.

Methyldiethanolamine (MDEA) is the most widely used tertiary alkanolamine, generally for selective removal of $H_2S$ in relation to $CO_2$. The COS removal performances of MDEA are poor and it is necessary to add a kinetic activator, generally a primary or secondary alkanolamine, to optimize the efficiency of the solvent used in the method.

The object of the present invention thus is to overcome one or more of the drawbacks of the prior art by providing a method allowing removal of acid gases, such as $CO_2$, $H_2S$ and COS, from natural gas using a primary alkanolamine of higher chemical stability towards COS than those of the prior art.

SUMMARY OF THE INVENTION

The present invention thus relates to a method of removing acid gases contained in gaseous effluents, such as natural gas and fumes, comprising:

an acid gas absorption stage by contacting the gaseous effluents with an aqueous solution comprising 2-[2-amino-1-(aminomethyl)ethoxy]ethanol, and at least one aqueous solution regeneration stage.

The method is notably used for removal of carbonyl sulfide.

The aqueous solution can comprise between 5% and 60% by weight of 2-[2-amino-1-(aminomethyl)ethoxy]ethanol, preferably between 50% and 60% by weight of 2-[2-amino-1-(aminomethyl)ethoxy]ethanol.

In the method according to the invention, the 2-[2-amino-1-(aminomethyl) ethoxy]ethanol can be used as an activator of another alkanolamine, and the total amount of alkanolamines can reach up to 60% by weight, with up to 15% by weight of 2-[2-amino-1-(aminomethyl)ethoxy]ethanol.

The other alkanolamine can be MDEA (methyldiethanolamine) or any other tertiary alkanolamine.

According to the invention, the aqueous solution can also comprise an organic compound representing between 0% and 60% by weight of the aqueous solution. In this case, the total amount of alkanolamines ranges between 20% and 60% by weight.

The acid gas absorption stage is carried out at a pressure ranging between 50 bars and 80 bars, and at a temperature ranging between 30° C. and 90° C.

The method according to the invention can comprise a second aqueous solution regeneration stage.

The regeneration stages are carried out by expansion and/or thermal regeneration, at a pressure ranging between 1 bar and 5 bars, and at a temperature ranging between 100° C. and 180° C.

BRIEF DESCRIPTION OF THE FIGURES

Other features and advantages of the invention will be clear from reading the description hereafter, with reference to the accompanying figures given by way of example.

DETAILED DESCRIPTION

The present invention aims to use a molecule allowing to combine the characteristics of a primary alkanolamine and chemical stability towards COS: 2-[2-amino-1-(aminomethyl)ethoxy]ethanol, whose formula (A) is shown hereunder.

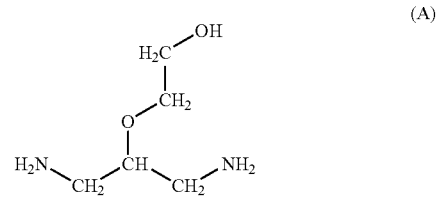

(A)

This molecule of formula A has two primary amine functions, which confers high reactivity with acid gases such as $CO_2$, $H_2S$ and COS. The presence of the ethanol group promotes its solubility in an aqueous solution, as for the alkanolamines conventionally used. The presence of the ethoxy group confers stability to the molecule towards COS, as already observed in the case of 2-aminoethoxyethanol.

This molecule can be obtained through several synthesis routes. An already known route could be extrapolated to the molecule claimed here. It is described by patent WO-9,321,254. This route consists in a polyoxyalkylation of an aminoalcoholate obtained by reaction on an amino alcohol of an anhydrous sodium, potassium, cesium or rubidium salt. This patent suggests placing ourselves under such conditions that the amine function should not react with the epoxide because the reaction promoted would be the reaction between the alcoholate and the epoxide. The alcoholate formed by reaction between the alcohol function and an anhydrous sodium, potassium, cesium or rubidium salt is considered much more reactive than the amine in this patent. This is illustrated by the examples of patent WO-9,321,254. It is however not demonstrated that the selectivity between the two reactions is total and the presence of products from the reaction between the amine function and the epoxide cannot be ruled out. Furthermore, this method seems to be reserved for very low-scale laboratory synthesis because, to proceed correctly, all of the alcohol functions would have to be converted to alcoholates, i.e. an equimolar proportion of sodium, potassium, cesium or rubidium salt/precursor would have to be used to generate the alcoholate. The reaction rapidity and exothermy prevents large-scale implementation thereof, and even less on an industrial basis. Furthermore, in this patent, the reaction times are long.

Figure 2:
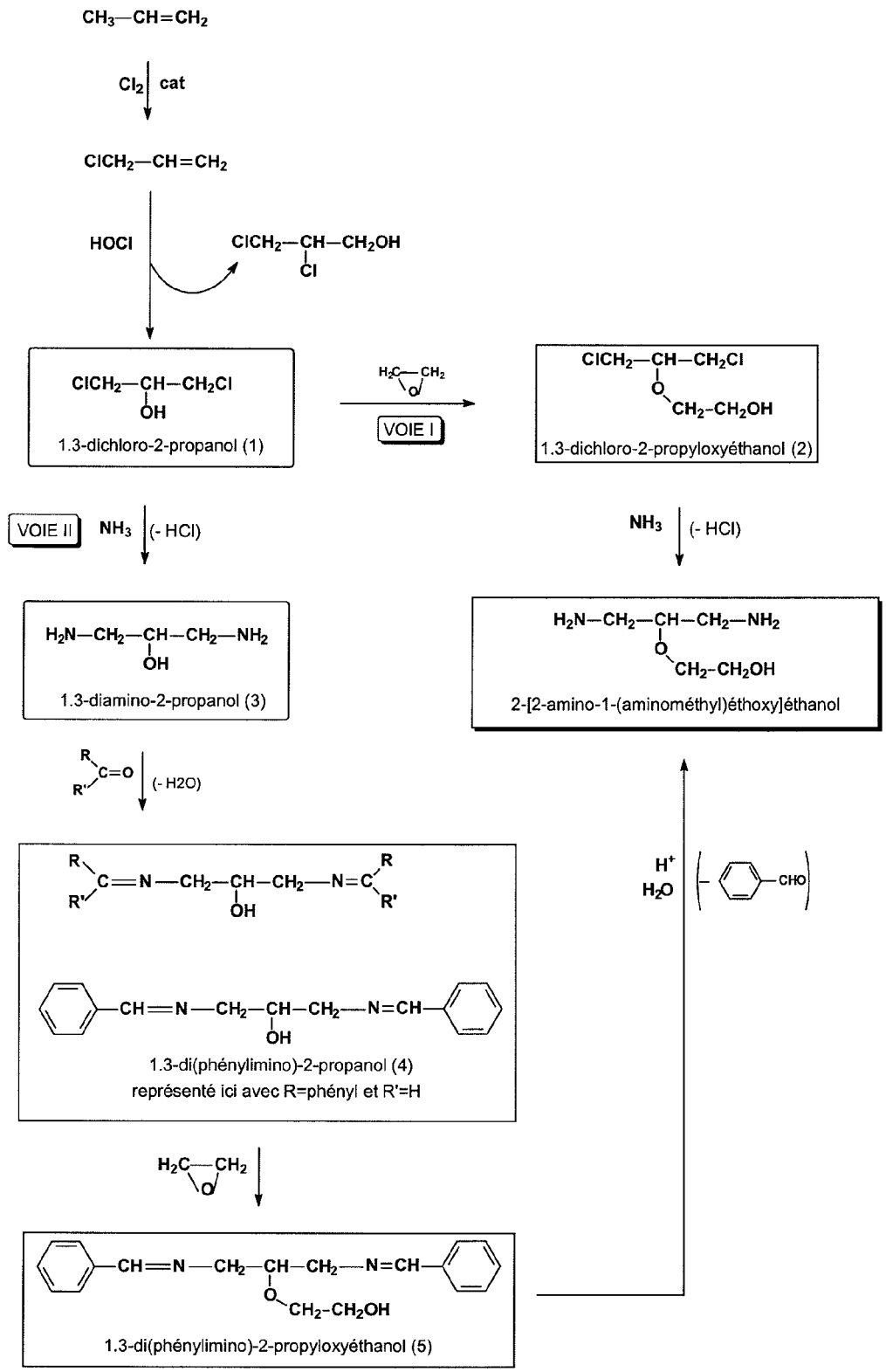
FIG. 2 shows two synthesis routes for the molecule according to the invention.

The synthesis of the 2-[2-amino-1-(aminomethyl)ethoxy] ethanol used within the context of the invention can be carried out according to at least two other synthesis routes (I and II) described hereafter, and illustrated by FIG. 2.

The starting material common to these two routes is 1.3-dichloro-2-propanol. It is a commercially available industrial product that is notably used as an epichlorhydrine precursor. This product is most often prepared industrially from propylene, in two stages, first chlorination with dichlorine leading to 3-chloropropene, followed by the addition of hypochlorous acid leading, on the one hand, to 1.2-dichloro-1-propanol and, on the other hand, to the 1.3-dichloro-2-propanol we are interested in here.

According to a first route (I), the preparation of 2-[2-amino-1-(aminomethyl) ethoxy]ethanol comprises the following two stages:

1—from the 1.3-dichloro-2-propanol (1), an ethoxylation reaction is carried out by reaction with ethylene oxide leading to 1.3-dichloro-2-propyloxyethanol (2). This reaction is generally conducted using a basic catalyst such as, for example, soda, sodium hydride or any other compound converting the alcohol function of 1.3-dichloro-2-propanol to alkaline or alkaline-earth alcoholate, which is the active species reacting with the oxyrane cycle. The catalyst concentration ranges between 0.1% and 2% by mole per mole of hydroxyl function. In order to prevent an ethylene oxide polymerization reaction, the reaction is carried out under mild conditions at a temperature below 70° C. and, most often, at ambient temperature. At the end of the reaction, the medium is neutralized with an acid to convert the alcoholate functions to alcohol functions;

2—an amination type reaction between the 1.3-dichloro-2-propyloxyethanol (2) obtained above and ammonia, leading to 2-[2-amino-1-(aminomethyl)ethoxy]ethanol. This reaction is carried out using excess ammonia in relation to the chlorine atoms in order to be sure to obtain primary amines. The reaction is conducted at a temperature ranging between ambient temperature and 150° C., most often between 30° C. and 80° C. At the end of the reaction, the excess ammonia is removed and the medium is treated by a base, soda for example, to eliminate the hydrochloric acid resulting from the condensation reaction. The product obtained, 2-[2-amino-1-(aminomethyl) ethoxy]ethanol, is preferably purified by distillation.

According to a second route (II), the preparation of 2-[2-amino-1-(aminomethyl) ethoxy]ethanol comprises the following four stages:

1—from the 1.3-dichloro-2-propanol (1), an amination reaction is carried out with ammonia under similar conditions to those described in stage 2 above. This reaction leads to 1.3-diamino-2-propanol (3);

2—on the 1.3-diamino-2-propanol obtained, an amine function protection reaction is carried out using a carbonyl compound RR'C=O selected from among aldehydes or ketones, for example an aldehyde such as benzaldehyde. This reaction leads to 1.3-di(phenylimino)-2-propanol (4). This reaction is conducted in the presence of excess benzaldehyde at a temperature and under conditions allowing elimination of the condensation water in order to promote the reaction. It is also possible to use as carbonyl compounds acetone leading to 1.3-di(dimethylimino)-2-propanol or methylethylketone leading to 1.3-di(methylethylimino)-2-propanol;

3—from the 1.3-di(phenylimino)-2-propanol (4 in the figure) from the previous stage, an ethoxylation reaction is carried out by reaction with ethylene oxide, leading to 1.3-di (phenylimino)-2-propyloxyethanol (5). This ethoxylation reaction is conducted under the same general conditions as those described for route (I) in the first stage;

4—from the 1.3-di(phenylimino)-2-propyloxyethanol (5) prepared above, or from a similar compound wherein the amine function protection agent RR'C=O would be different from benzaldehyde, an amine function deprotection reaction is performed. It is an amine hydrolysis reaction carried out in an acid medium. Hydrochloric acid can be advantageously used. The reaction is carried out at the water reflux temperature. The products are then separated. The product obtained, 2-[2-amino-1-(aminomethyl) ethoxy]ethanol, is preferably purified by distillation.

The molecule thus synthesized has a high reactivity with acid gases due to the presence of the two primary functions, a water solubility similar to that of the alkanolamines generally used because of the presence of the alcohol function, and a high stability towards COS. Its use for treating natural gas thus allows to aim at total deacidizing of the gas, with removal of the $CO_2$, the $H_2S$ and the COS. The 2-[2-amino-1-(aminomethyl)ethoxy]ethanol can be used as the main reactive agent for the solvent, or as the kinetic activator of another alkanolamine, preferably a tertiary alkanolamine.

The configuration of the method using a solution comprising 2-[2-amino-1-(aminomethyl)ethoxy]ethanol is similar to the configuration of a method involving a conventional aqueous alkanolamine solution. This configuration is well known to the person skilled in the art.

Figure 1:
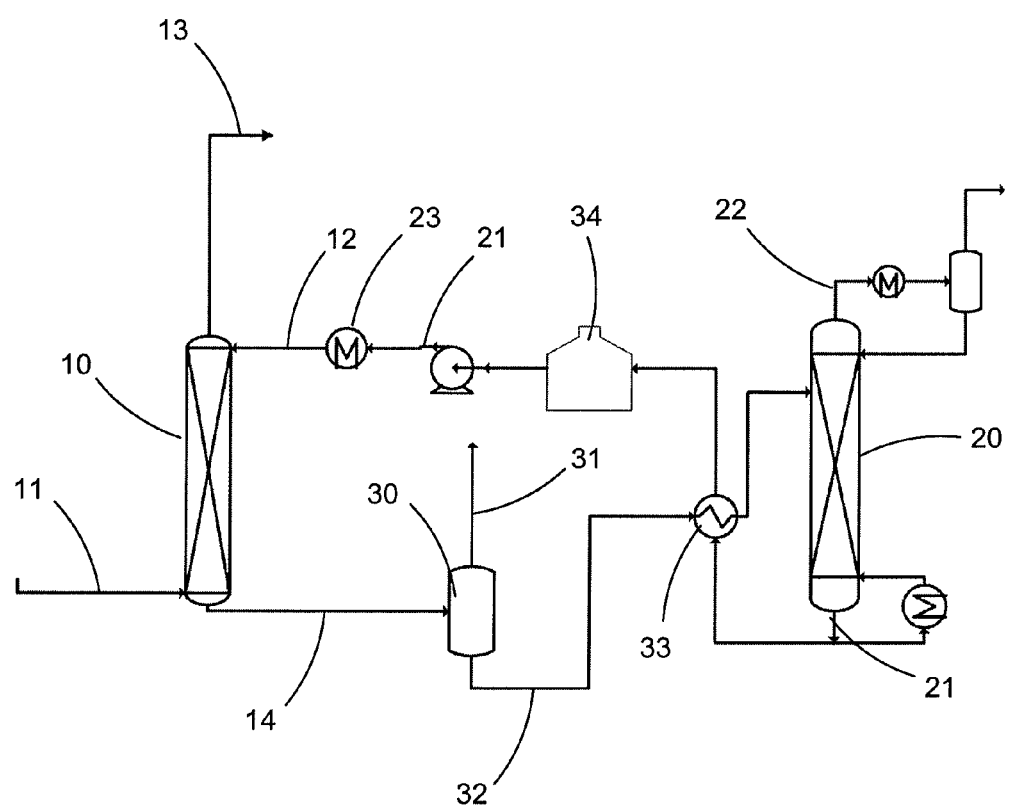
FIG. 1 diagrammatically shows a method according to the invention.

The first stage of the method is an acid gas absorption stage by contacting the aqueous alkanolamine solution. As illustrated in FIG. 1, absorption column (10) is supplied at the bottom with the gas to be treated (11), and at the top with deacidizing solvent (12). Gas-liquid contact between the gas to be deacidized and the solvent containing the 2-[2-amino-1-(aminomethyl)ethoxy]ethanol is carried out at the gas availability pressure and at a temperature ranging between 30° C. and 90° C., preferably between 40° C. and 60° C. For example, when treating a natural gas, the acid gas absorption stage can be carried out at a pressure ranging between 20 and 120 bars abs., generally between 50 and 80 bars abs. During the absorption stage, the acid gases are transferred into the solvent wherein they react with the 2-[2-amino-1-(aminomethyl) ethoxy]ethanol, alone or in admixture with another alkanolamine, according to acid-base reactions known to the person skilled in the art, and already described for the alkanolamines conventionally used for deacidizing a gaseous effluent. At the end of this absorption stage, the treated gas (13) is collected at the top and the solvent laden with acid gas (14) is collected at the bottom of the column.

A second stage of the method consists in regenerating the solvent from the absorption stage, containing the products from the reactions between the acid gases and the 2-[2-amino-1-(aminomethyl)ethoxy]ethanol, alone or in admixture with another alkanolamine. Regeneration can be performed by expansion (30) and/or by thermal regeneration. This expansion stage (30) allows to recover the hydrocarbons (31) coabsorbed in the solvent with the acid gas. The solvent collected (32) is then heated in heat exchanger (33) and sent to thermal regeneration column (20). The acid gases (22) are obtained at the top, the hot regenerated solvent (21) is obtained at the bottom of the column. The hot solvent (21) obtained at the bottom of the regeneration column is used to heat the solvent to be regenerated and it is sent to a storage tank (34) intended to supply the absorption column. The temperature of absorption solvent (12) is controlled by a regulation system (23) prior to being fed into absorption column (10).

This thermal regeneration stage is carried out at pressures ranging between 1 and 5 bars abs., generally between 1 and 2.5 bars abs. The temperature at the bottom of the column is correlated with the regeneration pressure and the alkanolamine content of the solvent to be regenerated. This temperature ranges between 100° C. and 150° C., generally between 110° C. and 130° C.

An additional regeneration stage can be considered if necessary. Its goal is to treat a fraction of the solvent so as to obtain a regeneration level compatible with the objectives of the method for acid gas removal. It consists in minimizing the acid gas content of the solvent sent back to the regeneration section.

The operating conditions of this second regeneration stage are similar to those of the regeneration section described above. The thermal level of this second section can preferably be higher. The steam flow rate generated in the thermal section can also be higher.

The solvent used within the context of the invention for removing acid gas from gaseous effluents is thus made up of 2-[2-amino-1-(aminomethyl)ethoxy]ethanol, in solution in water. The concentration of 2-[2-amino-1-(aminomethyl) ethoxy]ethanol in solution ranges between 5 and 60% by weight. The 2-[2-amino-1-(aminomethyl) ethoxy]ethanol can be the only reactive compound of the solvent, notably towards acid gases. In this case, the 2-[2-amino-1-(aminomethyl)ethoxy]ethanol concentration ranges between 30% and 60% by weight. The 2-[2-amino-1-(aminomethyl)ethoxy] ethanol can also be mixed with another alkanolamine. In this case, the alkanolamines that are conventionally used can be implemented. The 2-[2-amino-1-(aminomethyl) ethoxy] ethanol can notably be used in admixture with MDEA or any other tertiary alkanolamine known to the person skilled in the art. The aqueous solution then contains up to 60% by weight of total alkanolamines. In this configuration, the 2-[2-amino-1-(aminomethyl)ethoxy]ethanol represents up to 15% by weight of the solution.

An alternative to the aqueous solutions of 2-[2-amino-1-(aminomethyl) ethoxy]ethanol consists in using a solvent made up of 2-[2-amino-1-(aminomethyl) ethoxy]ethanol, alone or in admixture with another alkanolamine, water and an organic compound. The organic compounds can preferably be water, glycols, polyethylene glycols, polypropylene glycols, ethylene glycol-propylene glycol copolymers, glycol ethers, alcohols, ureas, lactames, N-alkylated pyrrolidones, N-alkylated piperidones, cyclotetramethylenesulfones, N-alkylformamides, N-alkyl-acetamides, ether-ketones or alkyl phosphates and their derivatives. By way of non limitative example, it can be water, tetraethylene glycol dimethylether, sulfolane, N-methylpyrrolidone, propylene carbonate, dimethylpropylene urea, N-methyl-caprolactame, dimethylformamide, dimethylacetamide, formamide, acetamide, 2-methoxy-2-methyl-3-butanone, 2-methoxy-2-methyl-4-pentanone, or tributylphosphate. The organic compound represents 0% to 60% by weight of the mixture, the 2-[2-amino-1-(aminomethyl)ethoxy]ethanol, alone or in admixture with another alkanolamine, represents 20 to 60% by weight, the complement being achieved by addition of water.

The aqueous solution used within the context of the invention is preferably used for deacidizing a natural gas, notably in the case of the removal of the COS contained in the feed. It can also be considered for any gaseous effluent deacidizing application, such as for example decarbonation applications for fumes, such as combustion fumes, blast furnace fumes or cement plant fumes.

The method can also be implemented for deacidizing a liquid effluent, notably a condensed hydrocarbon cut. This cut can for example result from fractionation of a natural gas, as described above.

The invention claimed is:

1. A method of removing acid gases contained in gaseous effluents, characterized in that it comprises:
   an acid gas absorption stage by contacting the gaseous effluent with an aqueous solution comprising 2-[2-amino-1-(aminomethyl)ethoxy]ethanol, and
   at least one aqueous solution regeneration stage.

2. A method as claimed in claim 1, characterized in that it consists in removing carbonyl sulfide.

3. A method as claimed in claim 1, characterized in that the aqueous solution comprises between 5% and 60% by weight of 2-[2-amino-1-(aminomethyl)ethoxy]ethanol.

4. A method as claimed in claim 3, characterized in that that the aqueous solution comprises between 50% and 60% by weight of 2-[2-amino-1-(aminomethyl)ethoxy]ethanol.

5. A method as claimed in claim 1, characterized in that the 2-[2-amino-1-(aminomethyl)ethoxy]ethanol is used as an activator of another alkanolamine, and the total amount of alkanolamines can reach up to 60% by weight, with up to 15% by weight of 2-[2-amino-1-(aminomethyl)ethoxy]ethanol.

6. A method as claimed in claim 5, characterized in that the aqueous solution comprises MDEA (methyldiethanolamine) or any other tertiary alkanolamine.

7. A method as claimed in claim 1, characterized in that the aqueous solution comprises an organic compound, representing between 0% and 60% by weight of the aqueous solution, and between 20% and 60% of alkanolamines.

8. A method as claimed in claim 1, characterized in that the acid gas absorption stage is carried out at a pressure ranging between 50 bars and 80 bars, and at a temperature ranging between 30° C. and 90° C.

9. A method as claimed in claim 1, characterized in that the regeneration stages are carried out by expansion and/or thermal regeneration.

10. A method as claimed in claim 9, characterized in that the thermal regeneration stage is carried out at a pressure ranging between 1 bar and 5 bars, and at a temperature ranging between 100° C. and 180° C.

* * * * *